US006828872B2

(12) United States Patent
Komai et al.

(10) Patent No.: US 6,828,872 B2

(45) Date of Patent: Dec. 7, 2004

(54) IRREVERSIBLE CIRCUIT DEVICE SUPPRESSING DROP OF INSERTION LOSS AND ACHIEVING COMPACT SCALE

(75) Inventors: Eiichi Komai, Niigata-ken (JP); Hitoshi Onishi, Niigata-ken (JP); Toshio Takahashi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 28 days.

(21) Appl. No.: 10/440,769

(22) Filed: May 19, 2003

(65) Prior Publication Data

US 2003/0218513 A1 Nov. 27, 2003

(30) Foreign Application Priority Data

May 21, 2002 (JP) ....................................... 2002-146602

(51) Int. Cl.[7] .............................. H01P 1/32; H01G 4/04

(52) U.S. Cl. ....................... 333/1.1; 333/24.2; 361/311; 361/312

(58) Field of Search ................................ 333/1.1, 24.2; 361/311, 312

(56) References Cited

U.S. PATENT DOCUMENTS

| | | | | |
|---|---|---|---|---|
| 5,900,789 A | * | 5/1999 | Yamamoto et al. | 333/1.1 |
| 6,545,558 B2 | * | 4/2003 | Hasegawa | 333/1.1 |
| 6,597,563 B2 | * | 7/2003 | Matsuta et al. | 333/1.1 |
| 6,650,198 B2 | * | 11/2003 | Hasegawa | 333/1.1 |

FOREIGN PATENT DOCUMENTS

JP 2002-237703 8/2002

* cited by examiner

*Primary Examiner*—Michael Tokar
*Assistant Examiner*—Lam T. Mai
(74) *Attorney, Agent, or Firm*—Brinks Hofer Gilson & Lione

(57) ABSTRACT

A yoke main body formed of an upper yoke and a lower yoke accommodates therein a magnetic substrate, a plurality of line conductors, a plurality of capacitor substrates, a magnetic member and a spacer member. The line conductors are connected to one another on one of the surface sides of the magnetic substrate, and each end of the line conductors put one upon another on a main surface side of the magnetic substrate is connected to the capacitor substrate. A gap portion for magnetically insulating the upper yoke and the lower yoke is defined between them.

10 Claims, 8 Drawing Sheets

IRREVERSIBLE CIRCUIT DEVICE SUPPRESSING DROP OF INSERTION LOSS AND ACHIEVING COMPACT SCALE

BACKGROUND OF THE INVENTION

1. Field of the Invention

This invention relates to an irreversible circuit device typified by an isolator or a circulator that is used in a high frequency band such as a microwave band.

2. Description of the Related Art

FIG. 13 of the accompanying drawings is an exploded perspective view of an ordinary isolator (irreversible circuit device) according to the prior art. The isolator 60 shown in the drawing includes a lower yoke 61 and an upper yoke 62, and sandwiches a magnetic member 63, a spacer member 64, a magnetic assembly 65, capacitor substrates 66, 67 and 68, a terminating resistor 69 and a substrate 70 between the upper and lower yokes 62 and 61.

The magnetic assembly 65 in this prior art example includes a magnetic substrate 72 formed of a ferrite sheet, etc, center conductors 73, 74 and 75 arranged on a top surface side of the magnetic substrate 72 and a common electrode connected to these conductors on the back side of the magnetic substrate 72. A slit splits each center conductor 73, 74, 75 into two parts.

Thin sheet-like capacitor substrates 66, 67 and 68 are arranged on the substrate 70. The magnetic assembly 65 is arranged inside these capacitor substrates 66, 67 and 68. A distal end 73*a*, 74*a*, 75*a* of each center conductor 73, 74, 75 of the magnetic assembly 65 is soldered to the capacitor substrate 66, 67, 68 arranged beneath it. A sheet-like spacer member 64 having protuberances 64*a* and 64*a* is arranged above the magnetic assembly 65 and a sheet-like magnetic member 63 is arranged on the spacer member 64.

In the isolator of the prior art example shown in FIG. 13, the magnetic member 63 is disposed to apply a bias magnetic field to the magnetic substrate 72. To form a magnetic path of the bias magnetic field from the magnetic member 63, the side end portions of the lower and upper yokes 61 and 62 are bent vertically to form bent portions. The lower and upper yokes 61 and 62 are so shaped as to constitute a box shape as a whole when they are put together.

However, as the device size of the isolator has been reduced year by year in the unit of millimeters (mm), however, positional influences of the yoke side surface portions invite deterioration of uniformity of the bias magnetic field applied to the magnetic substrate 72 because the side surface portions of the yokes and the magnetic substrate 72 are arranged close to one another or because the yoke side surface portions and the magnetic member 63 are arranged close to one another. In consequence, there is problem that performance drops such as the increase of the insertion loss as the isolator.

To allow a uniform bias magnetic field to act on the magnetic substrate 72 in the isolator 60 shown in FIG. 13, it has been customary to shape the magnetic substrate 72 into a size smaller than that of the magnetic member 63 and to let the uniform bias magnetic field act on the magnetic substrate 72 as a whole. Therefore, the size of the magnetic substrate 72 has been set to about 50% of the full width of the isolator 60 in the prior art. To improve performance as the isolator 60, however, there is a problem that the magnetic substrate 72 is preferably as large as possible.

SUMMARY OF THE INVENTION

In view of the problems of the prior art described above, it is an object of the invention to provide an irreversible circuit device that can suppress disturbance of a bias magnetic field acting on a peripheral portion of a magnetic substrate by forming a gap portion at sidewall portions of yokes formed of a ferromagnetic materials, can prevent the drop of an insertion loss as an irreversible circuit device, and can reduce an overall size of the device without inviting the drop of the insertion loss.

In view of the problems of the prior art described above, it is another object of the invention to provide an irreversible circuit device that can suppress disturbance of a bias magnetic field acting on a peripheral portion of a magnetic substrate by forming a gap portion at sidewall portions of yokes formed of a ferromagnetic materials, can prevent the drop of an insertion loss as an irreversible circuit device, can reduce an overall size of the device without inviting the drop of the insertion loss and can improve performance by increasing as much as possible the size of the magnetic substrate.

To accomplish the objects described above, one aspect of the invention provides an irreversible circuit device comprising a yoke main body having sidewall portions defined by an upper yoke and a lower yoke, and accommodating therein a magnetic substrate, a plurality of line conductors arranged on a main plane of the magnetic substrate while being individually insulated from one another, a plurality of capacitor substrates arranged around the magnetic substrate and a magnetic member for applying a DC bias magnetic field in substantially a vertical direction to the main plane of the magnetic substrate, wherein the line conductors are put one upon another on the main surface side of the magnetic substrate and are connected to one another on the other surface side of the magnetic substrate, each end of the line conductors put one upon another on the main surface side of the magnetic substrate is connected to the capacitor substrate, and a gap portion for magnetically insulating the upper yoke and the lower yoke is formed on the sidewall portion of the yoke main body.

When the gap portion for magnetically isolating the upper yoke and the lower yoke is interposed between them, magnetic interference between the magnetic member and the sidewall portions of the upper and lower yokes and between the magnetic substrate and the sidewall portions of the upper and lower yokes does not easily occur, and disturbance of the bias magnetic field acting on from the magnetic member to the magnetic substrate can be reduced even when the irreversible circuit device is rendered compact in size. Eventually, the insertion loss can be suppressed. Because disturbance of the bias magnetic field can be thus suppressed, the sidewall portions of the yoke main body can be brought closer to the magnetic member or to the magnetic substrate than in the prior art construction, and the size of the irreversible circuit device can be reduced.

To accomplish the objects described above, another aspect of the invention provides an irreversible circuit device comprising a yoke main body having sidewall portions defined by an upper yoke and a lower yoke, and accommodating therein a magnetic substrate, a plurality of line conductors arranged on a main plane of the magnetic substrate while being individually insulated from one another, a plurality of capacitor substrates arranged around the magnetic substrate and a magnetic member for applying a DC bias magnetic field in substantially a vertical direction to the main plane of the magnetic substrate, wherein the line conductors are put one upon another on the main surface side of the magnetic substrate and are connected to one another on one of surface sides of the magnetic substrate, each end of the line conductors put one upon another on the main surface side of the magnetic substrate is connected to the capacitor substrate, the magnetic substrate is formed into a rectangular shape as viewed in a plan view, the length of a major side of the rectangular magnetic substrate is set to a length within the range of 65 to 100% of an inner diameter of the yoke main body, and a gap portion for magnetically insulating the upper yoke and the lower yoke is formed on the sidewall portion of the yoke main body.

When the gap portion for magnetically isolating the upper yoke and the lower yoke is interposed between them, magnetic interference between the magnetic member and the sidewall portions of the upper and lower yokes and between the magnetic substrate and the sidewall portions of the upper and lower yokes does not easily occur, and disturbance of the bias magnetic field acting on the magnetic substrate from the magnetic member can be reduced even when the irreversible circuit device is rendered compact in size. Eventually, the insertion loss can be suppressed. Because disturbance of the bias magnetic field can be thus suppressed, the distance from the sidewall portions to the magnetic member or to the magnetic substrate can be much more decreased, and the size of the irreversible circuit device can be reduced. In addition, because disturbance of the bias magnetic field can be reduced, the size of the magnetic substrate can be increased much more than ever, and performance of the irreversible circuit device can be improved.

To solve the problems described above, the gap portion described above is arranged in a region of the sidewall portion of the yoke main body adjacent to a side surface of the magnetic substrate.

Because the gap portion is arranged in the adjacent region of the magnetic substrate, even when the magnetic substrate and the sidewall portions of the yokes can be brought closer to one another and in a compact construction, and disturbance of the magnetic field does not easily occur.

To solve the problems described above, the yoke main body is shaped into a box shape by the upper yoke, the lower yoke and resin molded portions provided accessorily to the upper and lower yokes.

Because the sidewall portions of the yokes do not exist at portions where the gap portion is provided, a resin molded portion not having magnetic influences is preferably arranged to retain the overall shape of the yokes. In consequence, the shape as the yokes can be retained without affecting the bias magnetic field.

To solve the problems described above, a height of the side surface of the yoke main body of portions exclusive of a thickness of the gap portion in the yoke main body is not greater than a thickness of a magnetic member accommodated inside the yoke main body.

The thickness of the gap portion is preferably great. However, good characteristics can be easily obtained when the height of the side surface of the yoke main body exclusive of the thickness of the gap portion is smaller than the thickness of the magnetic member.

DESCRIPTION OF THE PREFERRED EMBODIMENTS

Preferred embodiments of the invention will be hereinafter described in further detail with reference to the accompanying drawings.

Figure 1A:
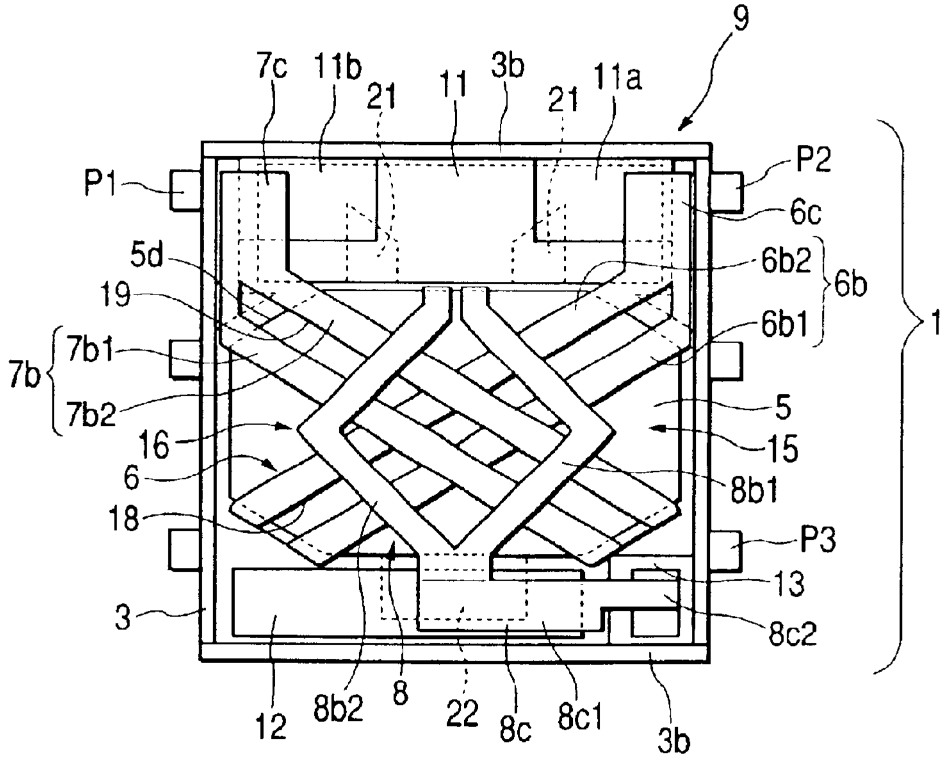
FIG. 1A is a plan view showing an internal construction of an isolator according to a first embodiment of the invention.
Figure 1B:
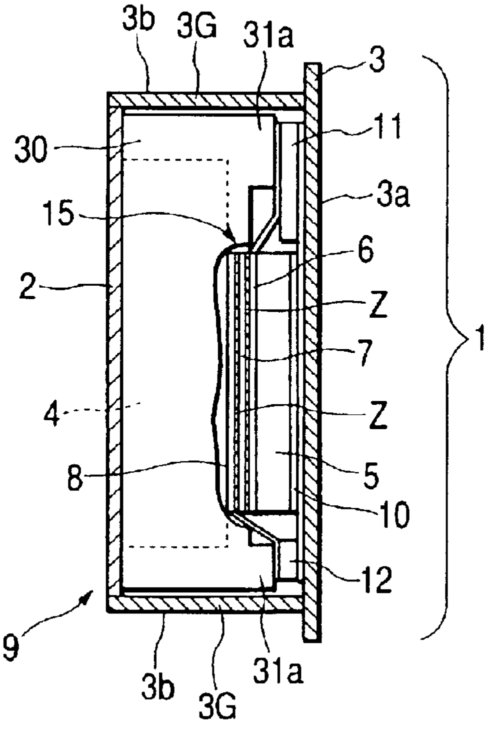
FIG. 1B is a partial sectional view of the isolator.
Figure 2:
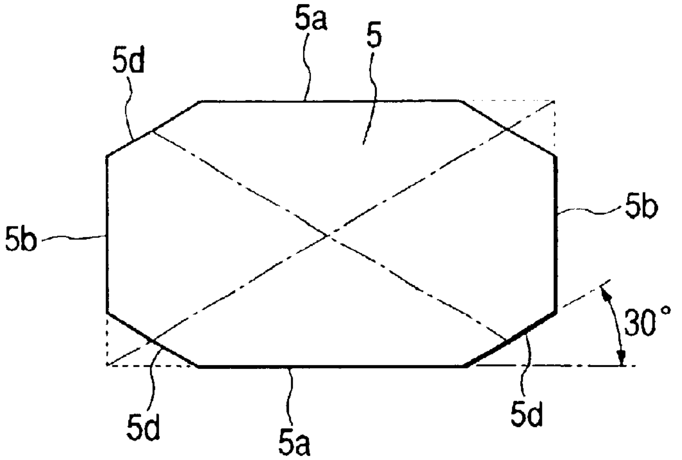
FIG. 2 is a plan view showing an example of a magnetic substrate used in the isolator according to the invention.
Figure 3:
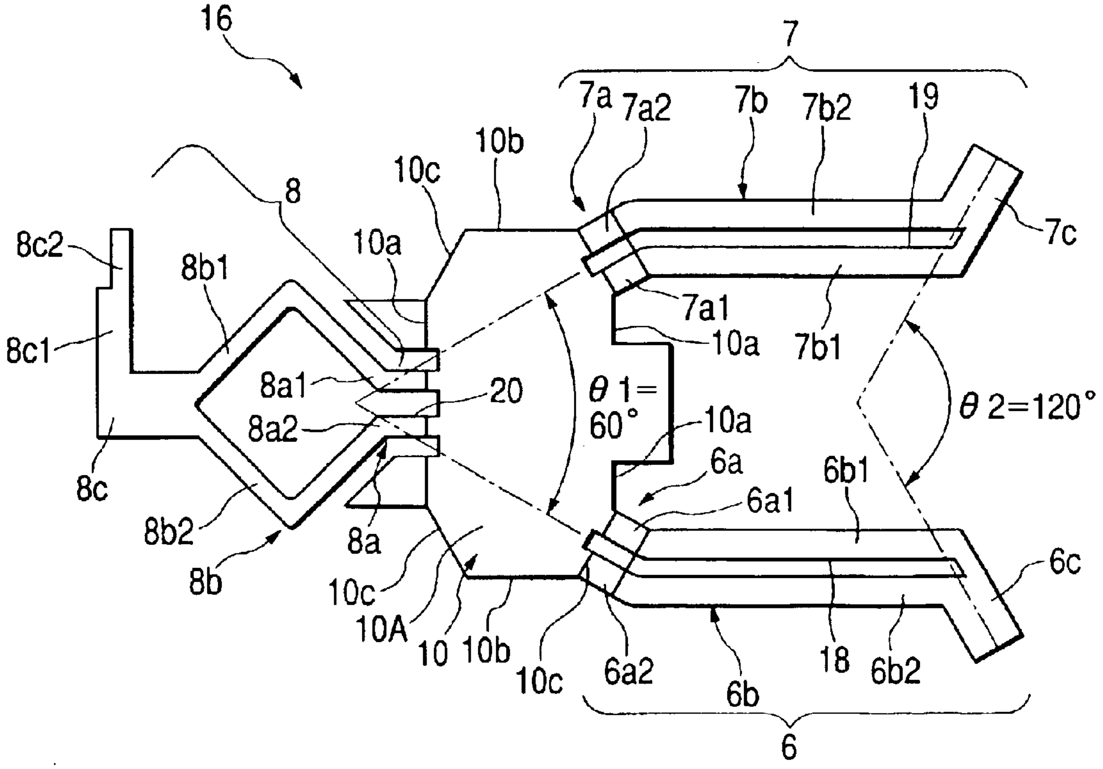
FIG. 3 is an exploded view showing an electrode portion used in the isolator according to the invention.

FIG. 1 to FIG. 3 show an isolator as an example of an irreversible circuit device according to a first embodiment of the invention. The isolator 1 according to the invention includes, inside a yoke main body 9 defined into a case shape by an upper yoke 2 and a lower yoke 3, a magnetic member 4 formed of a permanent magnet, a magnetic substrate 5 formed of a ferromagnetic material, line conductors 6, 7 and 8, a common electrode 10 to which the line conductors 6, 7 and 8 are connected, capacitor substrates 11 and 12 arranged around the magnetic substrate 5, and a terminating resistor (resistance device) 13.

The yoke main body 9 defined by the upper yoke 2 and the lower yoke 3 is shaped into a box shape having a size of about 4 mm×4 mm, for example. The upper yoke 2 that has a clamp-shaped section in a side view has a size such that it can be freely fitted to the lower yoke 3 having also a clamp-shaped section. Open portions of these upper and lower yokes 2 and 3 are fitted to each other both are united with each other and, they constitute the box-shaped yoke main body 9.

Figure 4:
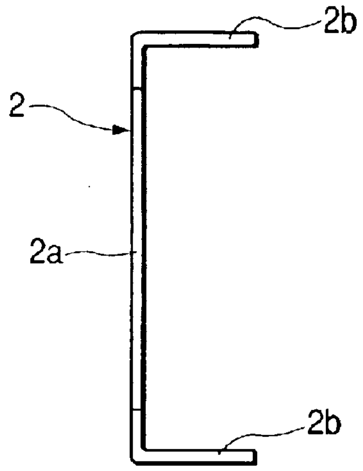
FIG. 4 is a side view showing an upper yoke provided to the isolator according to the invention.

In other words, the lower yoke 3 includes a bottom plate 3*a* formed of a ferromagnetic material having a rectangular planar shape and sidewall portions (outer wall portions) 3*b* formed of resin-molded portions and implanted to two opposing sides of the bottom plate 3*a*, and has the clamp-shaped section as shown in FIG. 1. The upper yoke 2 includes a ceiling plate 2*a* formed of a ferromagnetic material having a rectangular planar shape and sidewall portions (outer wall portions) 2*b* formed of resin-molded portions and implanted to two opposing sides of the ceiling plate 2*a*, and has the clamp-shaped section as shown in FIGS. 1 and 4. The yokes 2 and 3 are fitted to each other in such a fashion that the sidewall portions 2*b* and 2*b* of the upper yoke 2 and the sidewall portions 3*b* and 3*b* of the lower yoke 3 are arranged alternately. Because the sidewall portions 2*b* and 2*b* of the upper yoke 2 and the sidewall portions 3*b* and 3*b* of the lower yoke 3 are all formed of the resin, the portions between the upper yoke 2 and the lower yoke 3 are gap portions 3G.

Incidentally, the shapes of these yokes 2 and 3 are not limited to the shapes of this embodiment, and an arbitrary shape may well be used so long as a plurality of yokes constitutes the case main body 9. For example, the sidewall portions may be formed on only the peripheral portion of either one 4 of the yokes 2 and 3 and the other of the yokes 2 and 3 may be a single plate. Alternatively, the sidewall portions may be formed on the peripheral portion of either one 3 of the yokes 2 and 3 and the sidewall portions may be formed on the peripheral portion of the other 1 of the yokes 2 and 3. Furthermore, it is of course possible to employ a construction in which the sidewall portions of the resin molding is formed in such a fashion that only a part of the sidewall portions of the yokes 2 and 3 close to the yokes 2 and 3 is a bent portion and is extended, and both yokes are united with each other through this sidewall portion of the resin-molded portion.

A magnetic assembly 15 including the magnetic substrate 5, the three line conductors 6, 7 and 8 and the common electrode 10 connected to these line conductors 6, 7 and 8 is accommodated in the space encompassed by the lower yoke 2 and the upper yoke 3 that are fitted to each other as described above.

The magnetic substrate 5 is formed of a ferromagnetic material such as ferrite and has a substantial rectangular sheet shape that is elongated in the transverse direction as viewed in a plan view as shown in FIG. 2. More specifically, the magnetic substrate 5 includes two major sides 5*a* and 5*a* elongated in the transverse direction and opposing each other, minor sides 5*b* and 5*b* each describing right angle with the major side 5*a*, and slopes 5*d* connecting the major sides to the minor sides.

The three line conductors 6, 7 and 8 and the common electrode 10 are united with one another as shown in an exploded view of FIG. 3, and constitute as the main members an electrode portion 16. The common electrode 10 is formed of a metal sheet as a main body portion 10A that has a substantially similar shape to the shape of the magnetic substrate 5 as viewed in the plan view. The main body portion 10A has a substantially rectangular shape including two major side portions 10*a* and 10*a*, two minor side portions 10*b* and 10*b* and four slope portions 10*c* connecting the major side portions to the minor side portions.

The first and second line conductors 6 and 7 are extended and formed from two slope portions 10*c* on one of the major side portions among the slope portions 10*c* at the four corners of the common electrode 10. The first line conductor 6 including a first base conductor 6*a*, a first center conductor 6*b* and a first tip conductor 6*c* is first extended from one of the two slope portions 10*c*. Next, the second line conductor 7 including a second base conductor 7*a*, a second center conductor 7*b* and a second tip conductor 7*c* is extended from the other of the two slope portions 10*c*. Both base conductors 6*a* and 7*a* have the same width as the slope portion 10*c* so as to extend the slope portion 10*c*. Next, the center conductors 6*b* and 7*b* are formed in parallel with the minor side portions 10*b* of the common electrode 10.

A slit portion 18 is formed at the center of the first line conductor 6 in the width-wise direction so as to divide the center conductor 6*b* into two split conductors 6*b*1 and 6*b*2. The base conductor 6*a* is similarly divided into two split conductors 6*a*1 and 6*a*2. A slit portion 19 is formed at the center of the second line conductor 7 in the width-wise direction in such a manner as to divide into two split conductors 7*b*1 and 7*b*2. The base conductor 7*a* is similarly divided into two split conductors 7*a*1 and 7*a*2.

The third line conductor 8 is formed and extended at the center of the other major side portion 10*a* of the common electrode 10. The third line conductor 8 includes a third base conductor 8*a* so formed as to protrude from the common electrode 10, a third center conductor 8*b* and a third tip conductor 8*c*.

The third base conductor 8*a* has two rectangular split conductors 8*a*1 and 8*a*2, and a slit 20 is defined between the two split conductors 8*a*1 and 8*a*2. The third center conductor 8*b* has an L-shaped split conductor 8*b*1 as viewed in a plan view and a split conductor 8*b*2. The split conductors 8*b*1 and 8*b*2 together constitute the center conductor 8*b* having a rhombic shape.

The distal end sides of these split conductors 8*b*1 and 8*b*2 are united with the L-shaped third tip conductor 8*c*. The third tip conductor 8*c* has a connection portion 8*c*1 and a connection portion 8*c*2.

The main body portion 10A of the common electrode 10 having the construction described above is so arranged as to extend along the back (one of the surfaces) of the magnetic substrate 5. The first line conductor 6, the second line conductor 7 and the third line conductor 8 are bent towards the surface side (the other surface) of the magnetic substrate 5 and are fitted to the magnetic substrate 5, thereby constituting the magnetic assembly 15 together with the magnetic substrate 5.

When the first to third line conductors 6, 7 and 8 are fitted to the main surface (front surface) of the magnetic substrate 5 in the manner described above, the first line conductor 6 and the second line conductor 7 are individually arranged in superposition along the diagonals of the magnetic substrate 5 as shown in FIG. 1A.

Incidentally, an insulating sheet Z is interposed between the magnetic substrate 5 and each of the first to third line conductors 6, 7 and 8 as briefly shown in FIG. 1B to electrically insulate each line conductor, though the insulating sheet Z is not shown in FIG. 1A.

The magnetic assembly 15 is arranged at the center of the bottom of the lower yoke 3. Sheet-like capacitor substrates 11 and 12 having a thinly elongated shape as viewed in the plan view and a thickness about a half of the thickness of the magnetic substrate 5 are accommodated on both sides of the magnetic assembly 15 on the bottom side of the lower yoke 3. A terminating resistor 13 is accommodated on one of the sides of the capacitor substrate 12.

The tip conductor 6*c* of the first line conductor 6 is electrically connected to the electrode portion 11*a* formed at one of the ends of the capacitor substrate 11. The tip conductor 7*c* of the second line conductor 7 is electrically connected to the electrode portion 11*b* formed at the other end of the capacitor substrate 11. The tip conductor 8*c* of the third line conductor 8 is electrically connected to the capacitor substrate 12 and to the terminating resistor 13. In consequence, the capacitors 11 and 12 and the terminating resistor 13 are electrically connected to the magnetic assembly 15. Incidentally, the construction of this embodiment operates as a circulator unless the terminating resistor 13 is connected.

A first port P1 as an isolator 1 is formed on the end side of the capacitor 11 to which the tip conductor 7*c* is connected. A second port P2 as the isolator 1 is formed on the end side of the capacitor 11 to which the tip conductor 6*c* is connected. The end side of the capacitor 11 to which the tip conductor 8*c* is connected operates as a third port P3 as the isolator 1.

Figure 5:
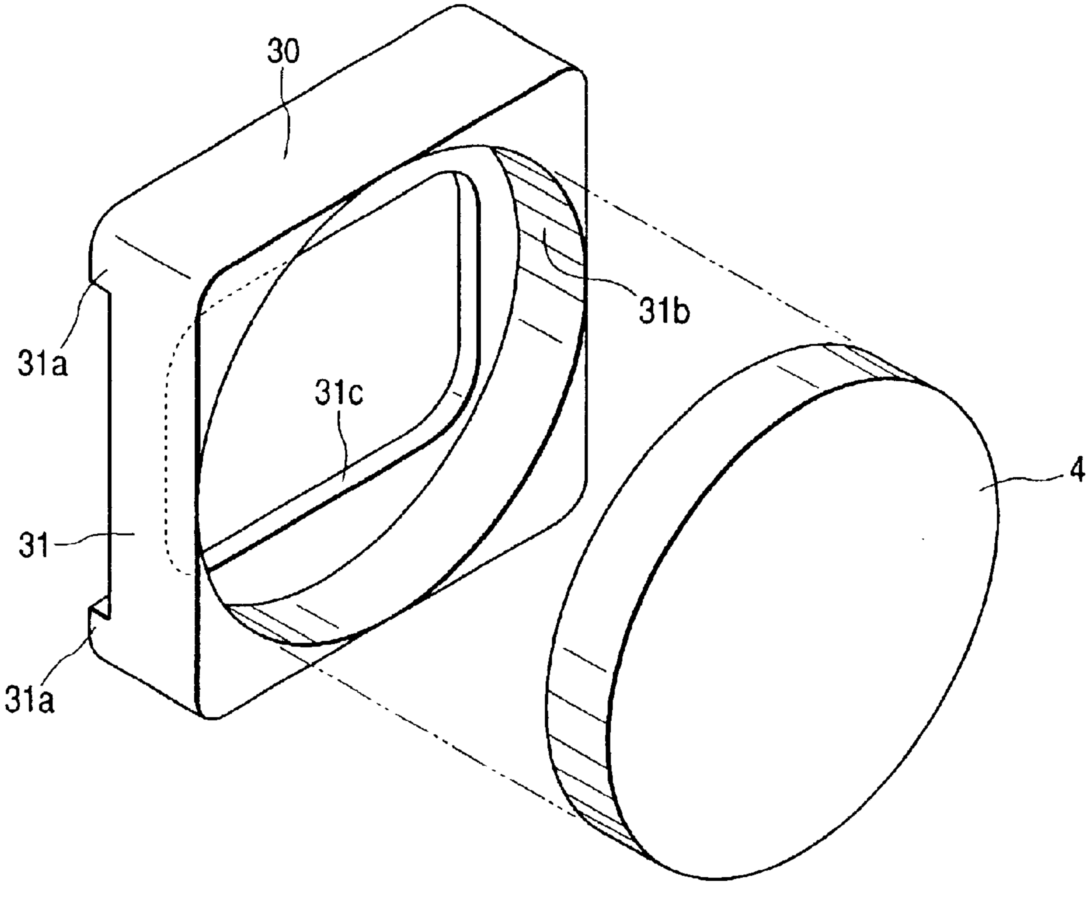
FIG. 5 is a perspective view showing an example of a spacer provided to the isolator according to the invention.

The magnetic assembly 15 is formed to a thickness that occupies about the half of the thickness of the space portion between the lower yoke 3 and the upper yoke 2. Therefore, a spacer member 30 shown also in FIG. 5 is accommodated in the space portion on the side of the upper yoke 2 above the magnetic assembly 15. A magnetic member 4 is put on the spacer member 30.

The spacer member 30 has a substrate portion 31 having a size that can be accommodated inside the upper yoke 2, and leg portions 31*a* formed at the respective four corners of the lower surface of the substrate portion 31. An accommodation recess portion 31*b* is formed on the substrate portion 31 on the side (upper surface) on which the leg portions (protuberances) 31*a* are not formed. A rectangular through-hole 31*c* is so formed on the bottom surface side of the accommodation recess portion 31*b* as to penetrate through the substrate portion 31.

Next, the transverse width of the magnetic substrate 5 shown in FIG. 1 (width in the longitudinal direction of the magnetic substrate 5 having the rectangular shape in the plan view) is preferably 65% to 100% of the transverse width of the yoke main body 9 having the yokes 2 and 3, and more preferably 75% to 100%. Assuming that the yokes 2 and 3 have a size of 4 mm square, the term "65% to 100%" means 2.6 mm to 4 mm and the term "75% to 100%" means 3 mm to 4 mm.

According to the prior art construction, the bias magnetic field is uniformly applied to the magnetic substrate. Therefore, the width is at most about 50%, that is, about 2 mm in the isolator having a size of 4 mm square. When the construction of the invention is employed and disturbance of the bias magnetic field of the peripheral portion of the magnetic substrate is eliminated, the magnetic substrate within the range described above can be acquired, and performance as the isolator 1 can be improved.

In an isolator for a 0.8 GHz band, for example, the conductor length of the center conductor to be arranged on the main plane of the magnetic substrate is believed preferably to be at least 3 mm. When the transverse width of the magnetic substrate 5 is 2.67 mm, the conductor length of 3 mm can be easily secured in consideration of the diagonal of the magnetic substrate 5. Therefore, the isolator having a size of 4 mm square can be accomplished. In contrast, when a magnetic substrate having a width of 2 mm of about 50% is used in an isolator having a size of 4 mm square, a line length of about 2.83 mm ($8^{1/2}$) is the limit that can be secured, even when the center conductor is arranged on the diagonal.

In the isolator 1 according to this embodiment shown in FIGS. 1 to 6, the bent portions of the center conductors 6*b*, 7*b* and 8*b* are folded in the line conductors 6, 7 and 8 as a correct angle on the surface side of the magnetic substrate 5. Therefore, signals inputted from the line conductors on the input side to the magnetic substrate 5 can be effectively transmitted to the output side, and low-loss broad band-pass characteristics can be accomplished. In other words, the magnetic assembly 15 having appropriate magnetic characteristics can be reliably acquired.

The sidewall of the lower yoke 3 is the resin sidewall portion 3*b* and the sidewall of the upper yoke 2 is the resin sidewall portion 2*b*. The gap between the peripheral portions of the upper and lower yokes 2 and 3 is the gap portion 3G. Therefore, the isolator 1 can be rendered compact in size, and even when the sidewall portions of the yokes 2 and 3 and the peripheral portion of the magnetic member 4 become closer to one another or when the sidewall portions of the yokes 2 and 3 and both end portions of the magnetic substrate 5 become closer to one another, the bias magnetic field in the substantially vertical direction can be applied to the entire range of the main plane (upper surface) of the magnetic substrate 5.

In contrast, if the sidewall portions of the yokes 2 and 3 are formed of a ferromagnetic material, the yoke sidewall portions of the ferromagnetic material disturb the bias magnetic field on both end sides of the magnetic substrate 5 with the result that the satisfactory bias magnetic field in the vertical direction cannot be applied to the main surface peripheral portion of the magnetic substrate 5. In comparison with this construction, the construction described above can more easily apply the bias magnetic field in the vertical direction to the main surface of the magnetic substrate 5.

FIG. 6 shows an example of a circuit construction of a cellular telephone unit to which the isolator 1 described above is applied. In the circuit construction of this example, a duplexer (antenna duplexer) 41 is connected to an antenna 40. An IF circuit 44 is connected to the output side of this duplexer 41 through a low-noise amplifier (amplifier) 42, an inter-stage filter 48 and a mixer circuit 43. An IF circuit 47 is connected to the input side of the duplexer 41 through the isolator 1, a power amplifier (amplifier) 45 and a mixer circuit 46. A local oscillator 50 is connected to the mixer circuits 43 and 46 through a distributing transformer 49.

Figure 6A:
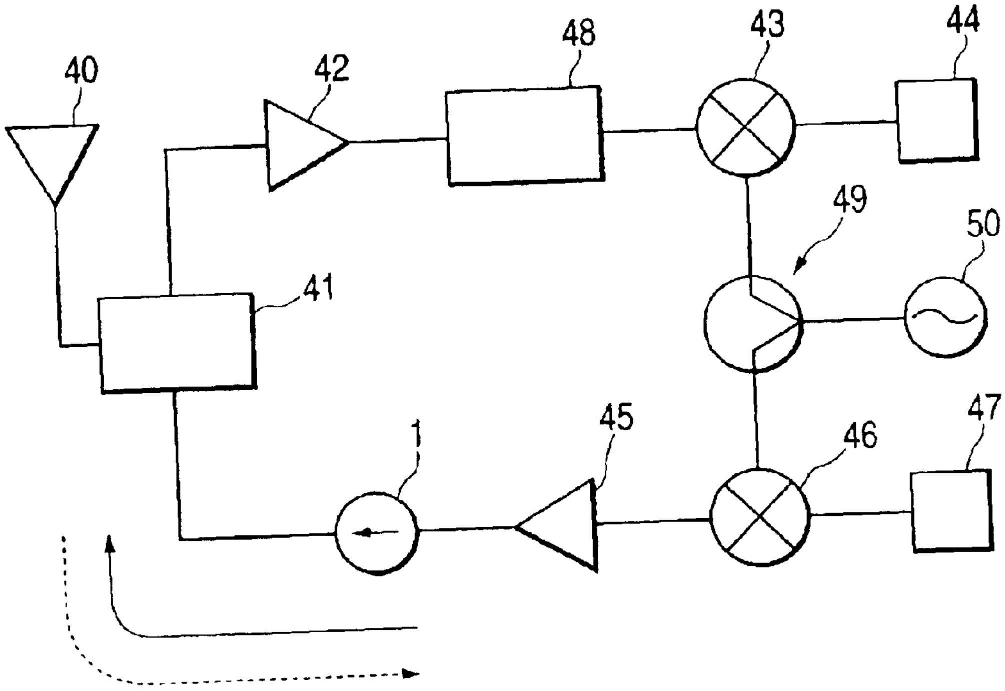
FIG. 6A is a block diagram showing an example of an electric circuit of a cellular telephone unit to which the isolator of the kind described above is provided.

The isolator 1 having the construction described above is incorporated and used in the circuit of the cellular telephone unit shown in FIG. 6A. The isolator 1 passes the signal from the isolator 1 to the side of the antenna duplexer 41 at a low loss but increases the loss and cuts off the signal in the opposite direction. Consequently, the isolator 1 operates in such a manner as to prevent unnecessary signals such as the noise on the side of the amplifier 45 from being inputted in the opposite direction to the side of the amplifier 42.

Figure 6B:
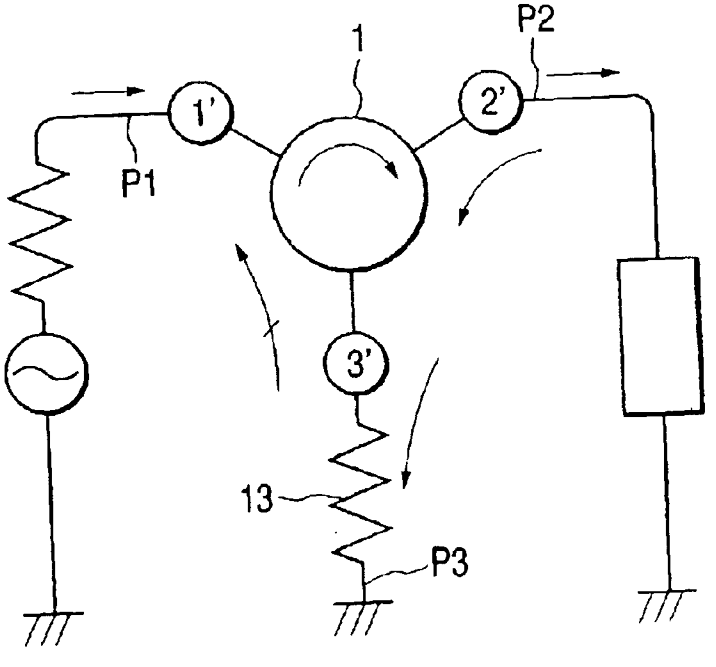
FIG. 6B is a circuit diagram showing an operation principle of the isolator.

FIG. 6B shows the operation principle of the isolator 1 having the construction described above. The isolator 1 incorporated in the circuit shown in FIG. 6B transmits the signals from the side of the first port P1 represented by reference numeral 1' to the second port P2 represented by reference numeral 2'. However, a terminating resistor 13 damps and absorbs the signal from the second port side P2 represented by reference numeral 2' to the side of the third port P3 represented by reference numeral 3'. The signal from the side of the third port P3 represented by reference numeral 3' on the side of the terminating resistor 13 to the first port P1 side represented by reference numeral 1' is cut off.

Therefore, when incorporated in the circuit shown in FIG. 6A, the isolator 1 provides the effect explained previously.

In the embodiment explained above, the magnetic assembly 15 comprises the combination of the substantially rectangular magnetic substrate 5 shown in FIG. 2 with the electrode portion 16 shown in FIG. 3. However, it is of course possible to use the combination of a disc-like magnetic substrate 72 shown in FIG. 13 with center conductors 73, 74 and 75 so arranged as to encompass the magnetic substrate 72 and a common electrode arranged on the back side. In the magnetic assembly used in the invention, the shape of the magnetic substrate used is not particularly limited, and the shape of the center conductor is not particularly limited, either.

In the embodiment described above, the sidewall portions of the yokes 2 and 3 are formed of the resin, and the portion formed of the ferromagnetic material is shaped into the sheet shape so that the yokes 2 and 3 are individually shaped into the clamp-shape as a whole. However, it is also possible to employ the construction in which both ends of the sheet-like ferromagnetic material are partially bent into the clamp-shape having the sidewall portions formed of only ferromagnetic material. It is also possible to form the sidewall portions of the resin in such a manner as to extend the sidewall portions of the bent portions of the ferromagnetic material. In this case, as to the yoke main body 9, a part of the sidewall portions is formed of the ferromagnetic material and another part is formed of the molded resin. When this construction is employed, the sidewall portions formed of the resin operate as the gap portion, and the thickness of the gap portion is smaller than the height of the sidewall portions of the yoke main body. This gap portion extends preferably around the entire periphery of the yoke main body but need not always exist around the entire periphery. For example, the gap portion may exist on only one side, two sides or three sides of the yoke main body.

When the bent portion of the yoke constitutes a part of the sidewall portion as described above, the length of the upper yoke 2 and the length of the bent portion of the lower yoke 3 may be 0.65 mm or below and 1.0 mm or below, respectively, when the magnetic member 6 is 0.65 mm thick, for example. Also, the length of the bent portion of the lower yoke 3 may be 0.65 mm or below while the length of the bent portion of the upper yoke may be 1.0 mm or below.

The length of each bent portion is preferably equal to, or smaller than, the thickness of the magnetic member 4 and is more preferably smaller than about the half of the thickness of the magnetic member 4. When the thickness of the magnetic member 4 is 0.65 mm, for example, the length of the bent portion is 0.65 mm or below and preferably 0.3 mm or below.

When the bent portions of the ferromagnetic material constitute the sidewall portions of the yokes in the relation of these values, predetermined intensity of the bias magnetic field can be obtained more easily by use of a thinner magnetic member 4 when the sidewall portions have a greater length, but the distribution of the bias magnetic field applied to the magnetic substrate 5 can be made more uniform when the sidewall portions of the yokes formed of the ferromagnetic material are shorter or do not exist.

EXAMPLES

Figure 13:
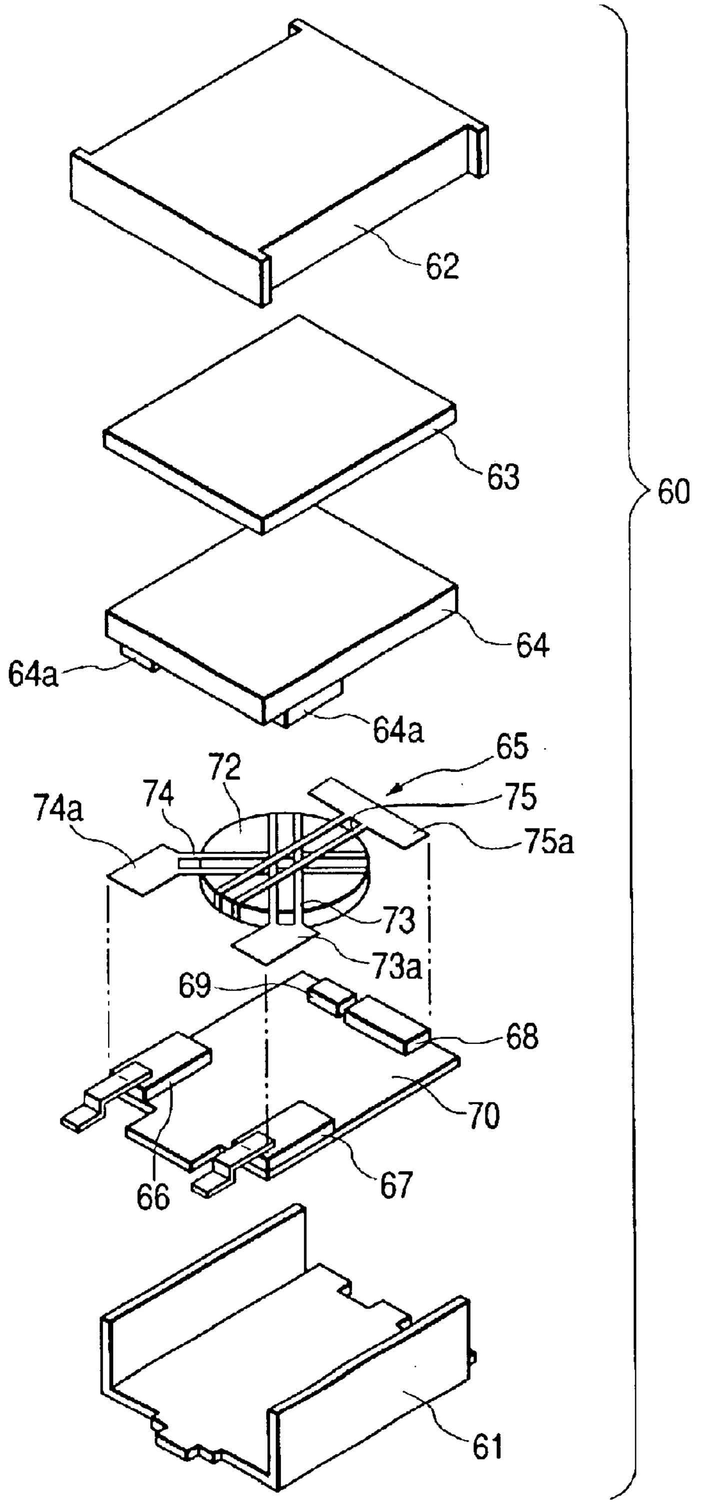
FIG. 13 PRIOR ART
FIG. 13 is an exploded perspective view showing an example of an isolator according to the prior art.

In the construction of the isolator shown in FIG. 1, an isolator is assembled by use of a disc-like magnetic substrate shown in FIG. 13 in place of the magnetic substrate having the substantially rectangular shape shown in FIG. 2, and is subjected to a test.

An isolator having a 4 mm square is produced. In this isolator, capacitance of a capacitor substrate to be connected to a port P1 at the distal end of a first center conductor and to a port P2 at the distal end of a second center conductor is set to 5.0 pF. Capacitance of a capacitor to be connected to a port P3 is set to 5.0 pF. A magnetic substrate formed of ferrite has a disc shape having a diameter of 2.0 mm and a thickness of 0.35 mm and produces an isolator of 4 mm square as a whole.

Both upper and lower yokes constituting the isolator have a 4 mm square formed of Fe or a Ni—Fe alloy. A gap between the upper yoke and the lower yoke (or in other words, height of peripheral wall portion of a molded resin) is set to 1.5 mm, and the thickness of a magnetic member is set to 0.65 mm.

The distance between the sidewall portion of the yoke main body and the magnetic substrate is changed to various values, and insertion loss characteristics of the isolator are measured at each value. The result is tabulated in Table 1 below.

TABLE 1

| | | |
|---|---|---|
| distance between ceramic substrate and yoke outer peripheral wall | 1.5 mm | 0.9 mm |
| insertion loss of sample having outer peripheral wall height of 1.5 mm | 0.49 dB | 0.61 dB |
| insertion loss of sample having outer peripheral wall height of 0.0 mm | 0.46 dB | 0.51 dB |

In Table 1, the sample having the outer peripheral wall height of 1.5 mm represents an isolator having a prior art construction (produced by bending one sheet-like body into a clamp-shape and using the bent portions as the outer peripheral wall) in which the height of the outer peripheral wall of each of the upper and lower yokes that has the clamp-shape section in side view and a square shape in a plan view is set to 1.5 mm. The sample having the outer peripheral wall height of 0.0 mm represents an isolator having a construction of the invention in which the yokes have a square shape in a plan view and its outer peripheral wall is formed of a molded resin. The distance between the magnetic substrate and the yoke outer peripheral wall represents the distance between the outer peripheral portion of the disc-like magnetic substrate and the edge of the yoke having the square shape in the plan view.

It can be understood from the result tabulated in Table 1 that the insertion loss is smaller in the sample having the yoke outer peripheral wall height of 0.0 mm than both in any case where the distance between the magnetic substrate and the yoke is 1.5 mm and 0.9 mm. It is therefore obvious that the construction according to the invention can provide an isolator having a smaller insertion loss than the prior art construction, and the insertion loss is smaller even when the distance between the magnetic substrate and the yoke is reduced. The increment ratio of the insertion loss can be lowered even when the distance between the magnetic substrate and the yoke is reduced, and this means that an isolator hardly inviting deterioration of performance can be acquired even when its size is reduced.

Figure 7:
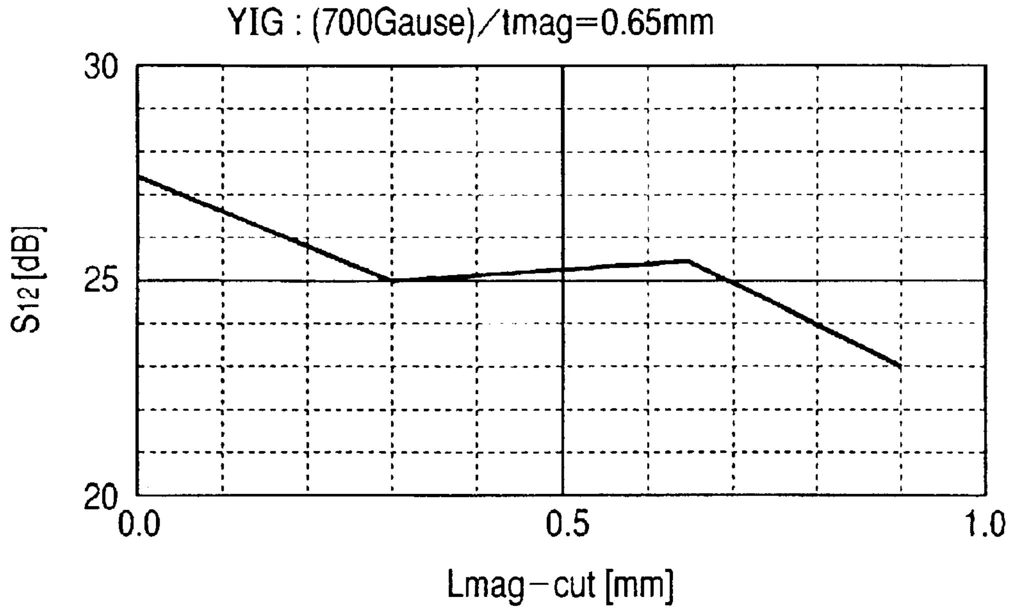
FIG. 7 is a graph showing a result of measurement of an $S_{12}$ value of values called "S parameters" in the isolator according to the embodiment of the invention.
Figure 8:
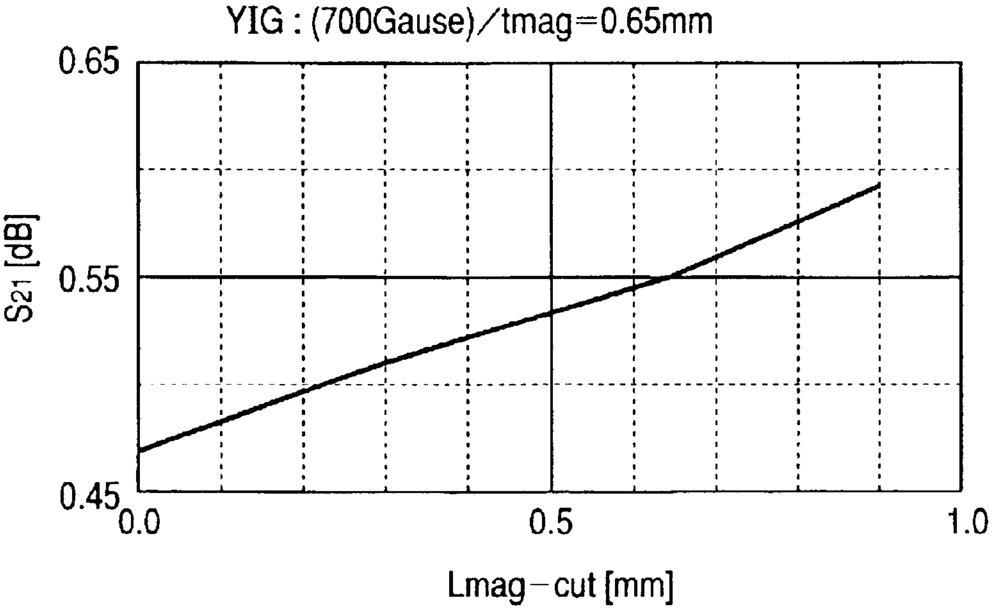
FIG. 8 is a graph showing a result of measurement of an $S_{21}$ value of values called "S parameters" in the isolator according to the embodiment of the invention.
Figure 9:
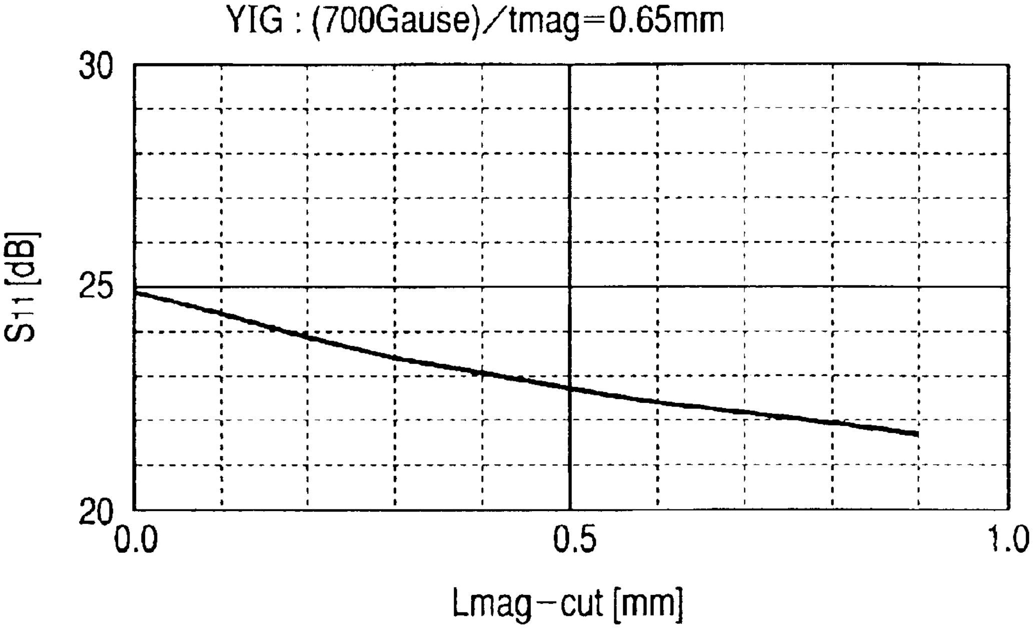
FIG. 9 is a graph showing a result of measurement of an $S_{11}$, value of values called "S parameters" in the isolator according to the embodiment of the invention.
Figure 10:
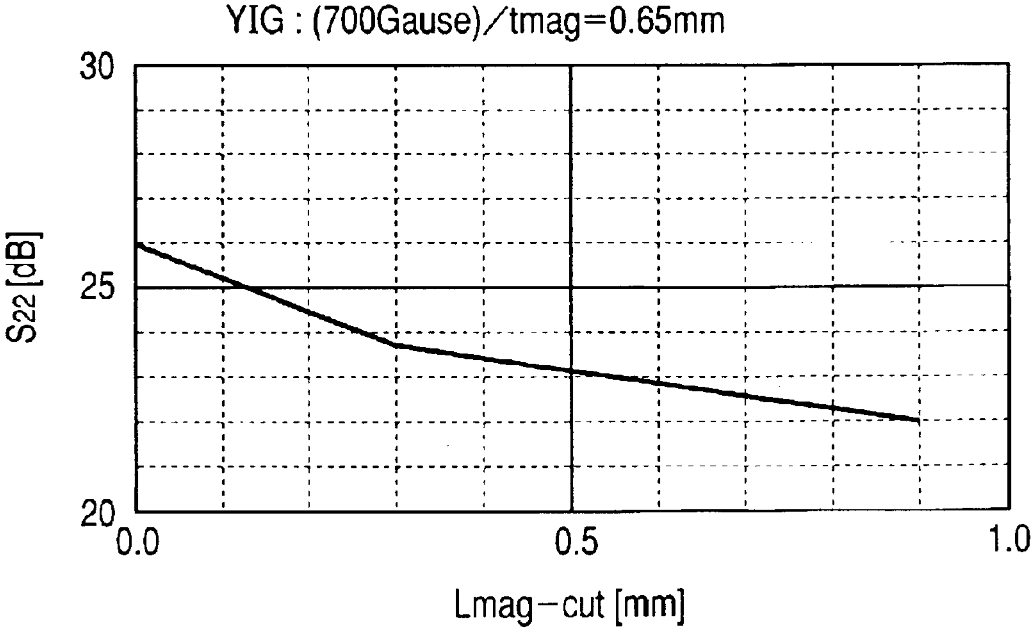
FIG. 10 is a graph showing a result of measurement of an $S_{22}$ value of values called "S parameters" in the isolator according to the embodiment of the invention.

FIG. 7 shows the measurement result of an $S_{12}$ value among values called “S parameters” of the isolator described above. FIG. 8 shows the measurement result of an $S_{21}$ value. FIG. 9 shows the measurement result of an $S_{11}$ value. FIG. 10 shows the measurement result of an $S_{22}$ value.

The S parameter is the one that is used for evaluating electronic components such as the isolator, and a value $|S_{21}|$, for example, is called “insertion loss”. Assuming that an electronic component has two ports P (inlet and outlet), the degree of reflection of a wave incident from a port P1 to the port P1 itself is $S_{11}$ (return loss) and the degree of transmission of this wave to a port P2 is $S_{21}$. On the other hand, the degree of reflection of a wave incident from the port P2 to the port P2 itself is $S_{22}$ (return loss) and the degree of transmission of the wave to the port P1 is $S_{12}$ (isolation).

In the measurement result of $S_{12}$ shown in FIG. 7, the value is 27.43 dB at 0.00 mm, 25.12 dB at 0.30 mm, 5.44 dB at 0.65 mm and 23.09 dB at 0.9 mm.

In the measurement result of $S_{21}$ shown in FIG. 8, the value is 0.46 dB at 0.00 mm, 0.48 dB at 0.30 mm, 0.50 dB at 0.65 mm and 0.52 dB at 0.9 mm.

In the measurement result of $S_{11}$ shown in FIG. 9, the value is 24.88 dB at 0.00 mm, 23.48 dB at 0.30 mm, 22.31 dB at 0.65 mm and 21.76 dB at 0.9 mm.

In the measurement result of $S_{22}$ shown in FIG. 10, the value is 25.94 dB at 0.00 mm, 23.71 dB at 0.30 mm, 22.70 dB at 0.65 mm and 22.08 dB at 0.9 mm.

The measurement result shown in FIG. 7 represents that no change occurs in the $S_{12}$ value within the range of 0.3 to 0.65 mm of the height of the yoke sidewall portion, and the value is likely to get deteriorated at 0.65 mm or above. The measurement results shown in FIGS. 8, 9 and 10 represent that all the $S_{21}$ value, $S_{11}$ value and the $S_{22}$ value exhibit a monatomic improvement of characteristics with the decrease of the height of the yoke outer peripheral wall. When the height of the yoke outer peripheral wall is 0.3 mm or below, these S parameter values can be used without any problem at all.

Figure 11:
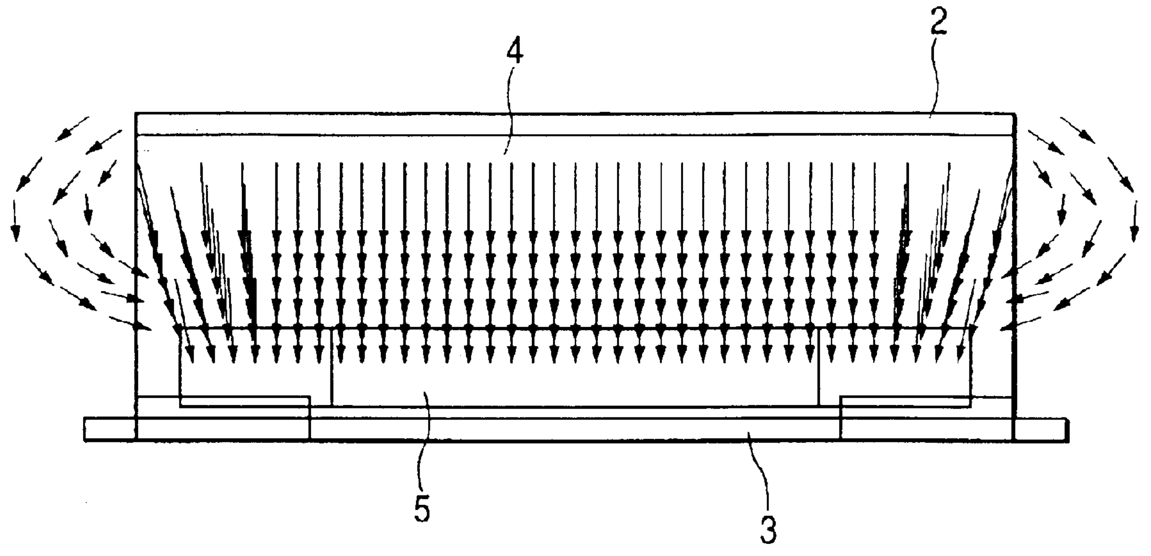
FIG. 11 is a schematic view showing a result of measurement of a magnetic field distribution in a typical isolator having the construction according to the invention.
Figure 12:
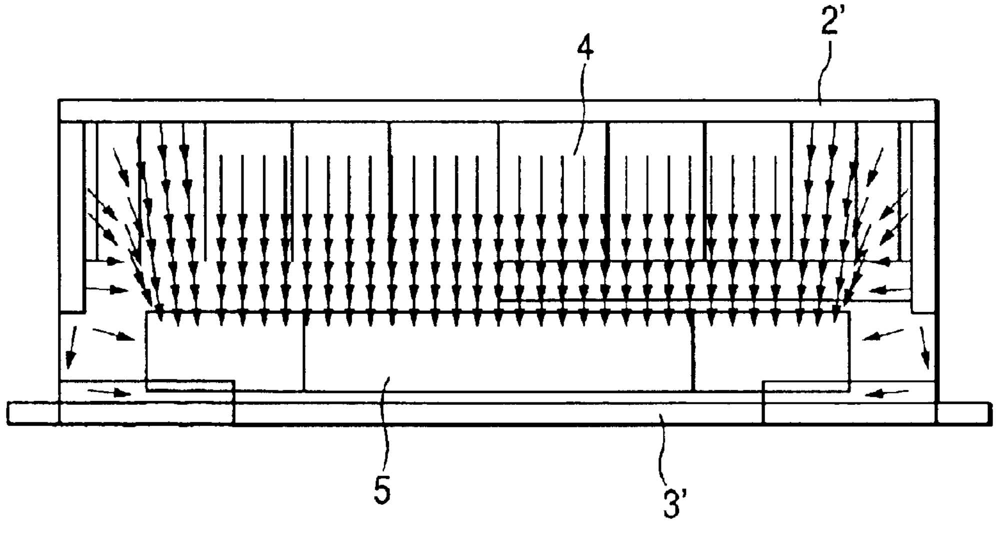
FIG. 12 is a schematic view showing a result of measurement of a magnetic field distribution in another typical isolator having the construction according to the invention.

FIGS. 11 and 12 show the measurement result of the magnetic field distribution in the isolator having the construction according to the invention. FIG. 11 shows the measurement result of the magnetic field distribution of the isolator having a construction in which the sidewall portions of each yoke 2, 3 is formed of the resin, the yoke 2, 3 is shaped into a single sheet form and the gap between the yokes 2 and 3 forms the gap portion as a whole. FIG. 12 shows the measurement result of the magnetic field distribution of the isolator having a construction in which about ⅔ of the sidewall portion of the yoke 2' is formed of the bent portion of the magnetic material, and about ⅓ of the height of the sidewall portion is used as the gap portion.

It can be clearly understood from FIGS. 11 and 12 that disturbance of the magnetic field is likely to develop on the peripheral side of the magnetic substrate 5 when the magnetic member 4 and the magnetic substrate 5 are brought close to the sidewall portion of yokes, but disturbance of the magnetic field is less in the proximity of the peripheral side portion of the magnetic substrate in the construction in which the gap between the upper and lower yokes is used as a whole as the gap portion.

When the gap portion for magnetically isolating the upper and lower yokes is interposed between the upper and lower yokes as in the invention, magnetic interference between the magnetic member and the sidewall portion of each of the upper and lower yokes and magnetic interference between the magnetic substrate and the sidewall portion of each yoke become difficult to occur even when the irreversible circuit device is rendered compact in size, and disturbance of the bias magnetic field acting on from the magnetic member to the magnetic substrate can be reduced. Eventually, the insertion loss can be suppressed. Because disturbance of the bias magnetic field can be suppressed, the distance between the sidewall portion of the yoke main body and the magnetic member or the magnetic substrate can be decreased, and the invention can provide an irreversible circuit device that hardly exhibits deterioration of performance even when its size is reduced.

Because disturbance of the bias magnetic field can be reduced in addition to miniaturization of the size of the irreversible circuit device, the size of the magnetic substrate can be increased to a level exceeding the conventional level and performance of the irreversible circuit device can be improved.

In the invention, the gap portion described above is arranged in the region of the yoke main body on the side surface side adjacent to the side surface of the magnetic substrate. Therefore, even when the construction is rendered compact by bringing the magnetic substrate close to the sidewall portion of the yoke, disturbance of the bias magnetic field does not easily occur.

The sidewall portion of the yoke does not exist at the portion of the yoke where the gap portion is arranged. Therefore, the resin-molded portion not exerting magnetic influences can be arranged to retain the overall shape of the yoke. Consequently, the shape of the yoke can be retained without affecting the bias magnetic field.

In the invention, the height of the side surface of the main body exclusive of the thickness of the gap portion is not greater than the thickness of the magnetic member accommodated inside the yoke, and excellent characteristics can thus be obtained.

What is claimed is:

1. An irreversible circuit device comprising:

a yoke main body having sidewall portions defined by an upper yoke and a lower yoke, and accommodating therein a magnetic substrate, a plurality of line conductors arranged on a main plane of said magnetic substrate while being individually insulated from one another, a plurality of capacitor substrates arranged around said magnetic substrate and a magnetic member for applying a DC bias magnetic field in substantially a vertical direction to the main plane of said magnetic substrate;

wherein said plurality of line conductors is put one upon another on a main surface side of said magnetic substrate and are connected to one another on an opposing surface side of said magnetic substrate, each end of said line conductors put one upon another on the main surface side of said magnetic substrate is connected to said capacitor substrate, and a gap portion for magnetically insulating said upper yoke and said lower yoke is formed on a sidewall portion of said yoke main body.

2. An irreversible circuit device as defined in claim 1, wherein said gap portion is arranged in a region of the sidewall portion of said yoke main body adjacent to a side surface of said magnetic substrate.

3. An irreversible circuit device as defined an claim 1, wherein said yoke main body is shaped into a box shape by said upper yoke, said lower yoke and resin molded portions provided accessorily to said upper and lower yokes.

4. An irreversible circuit device as defined in claim 1, wherein a height of the sidewall portion of said yoke main body exclusive of a thickness of said gap portion is not greater than a thickness of a magnetic member accommodated inside said yoke main body.

5. An irreversible circuit device as defined in claim 1, wherein each of said upper and lower yokes is formed of a sheet member of a ferromagnetic material, a sidewall portion of a bent portion is formed at an end portion of at least one of said upper and lower yokes, said main yoke main body is formed by uniting said upper and lower yokes with each other in such a fashion that said bent portion constitutes said sidewall portion, and said gap portion is defined between the other of said upper and lower yokes facing at least one of said bent portion of said upper yoke and said bent portion of said lower yoke.

6. An irreversible circuit device comprising:

a yoke main body having sidewall portions defined by an upper yoke and a lower yoke, and accommodating therein a magnetic substrate, a plurality of line conductors arranged on a main plane of said magnetic substrate while being individually insulated from one another, a plurality of capacitor substrates arranged around said magnetic substrate and a magnetic member for applying a DC bias magnetic field in substantially a vertical direction to the main plane of said magnetic substrate;

wherein said plurality of line conductors is put one upon another on a main surface side of said magnetic substrate and are connected to one another on one of surface sides of said magnetic substrate, each end at said line conductors put one upon another on the main surface side of said magnetic substrate is connected to said capacitor substrate, said magnetic substrate is formed into a rectangular shape as viewed in a plan view, a length of a major side of said rectangular magnetic substrate is set to a length within the range of 65 to 100% of an inner diameter of said yoke main body, and a gap portion for magnetically insulating said upper yoke and said lower yoke is formed on a sidewall portion of said yoke main body.

7. An irreversible circuit device as defined in claim 6, wherein said gap portion is arranged in a region of the sidewall portion of said yoke main body adjacent to a side surface of said magnetic substrate.

8. An irreversible circuit device as defined in claim 6, wherein said yoke main body is shaped into a box shape by said upper yoke, said lower yoke and resin molded portions provided accessorily to said upper and lower yokes.

9. An irreversible circuit device as defined in claim 6, wherein a height of the sidewall portion of said yoke main body exclusive of a thickness of said gap portion is not greater than a thickness of a magnetic member accommodated inside said yoke main body.

10. An irreversible circuit device as defined in claim 6, wherein each of said upper and lower yokes is formed of a sheet member of a ferromagnetic material, a sidewall, portion of a bent portion is formed at an end portion of at least one of said upper and lower yokes, said main yoke main body is formed by uniting said upper and lower yokes with each other in such a fashion that said bent portion constitutes said sidewall portion, and said gap portion is defined between the other of said upper and lower yokes facing at least one of said bent portion of said upper yoke and said bent portion of said lower yoke.

* * * * *

UNITED STATES PATENT AND TRADEMARK OFFICE

CERTIFICATE OF CORRECTION

PATENT NO. : 6,828,872 B2
DATED : December 7, 2004
INVENTOR(S) : Eiichi Komai et al.

It is certified that error appears in the above-identified patent and that said Letters Patent is hereby corrected as shown below:

Column 12,
Line 45, after "as defined" delete "an" and substitute -- in -- in its place.

Column 13,
Line 12, after "each end" delete "at" and substitute -- of -- in its place.

Signed and Sealed this

Thirteenth Day of September, 2005

Jon W. Dudas

JON W. DUDAS
*Director of the United States Patent and Trademark Office*